G. LANGFORD

Aug. 16, 1932.

TIGHT CENTER BAR

Re. 18,568

3 Sheets-Sheet 1

Original Filed March 25, 1929

Inventor:
George Langford.
By Brown, Jackson, Boettcher & Dienner Attys

G. LANGFORD
Aug. 16, 1932. TIGHT CENTER BAR Re. 18,568
3 Sheets-Sheet 2
Original Filed March 25, 1929
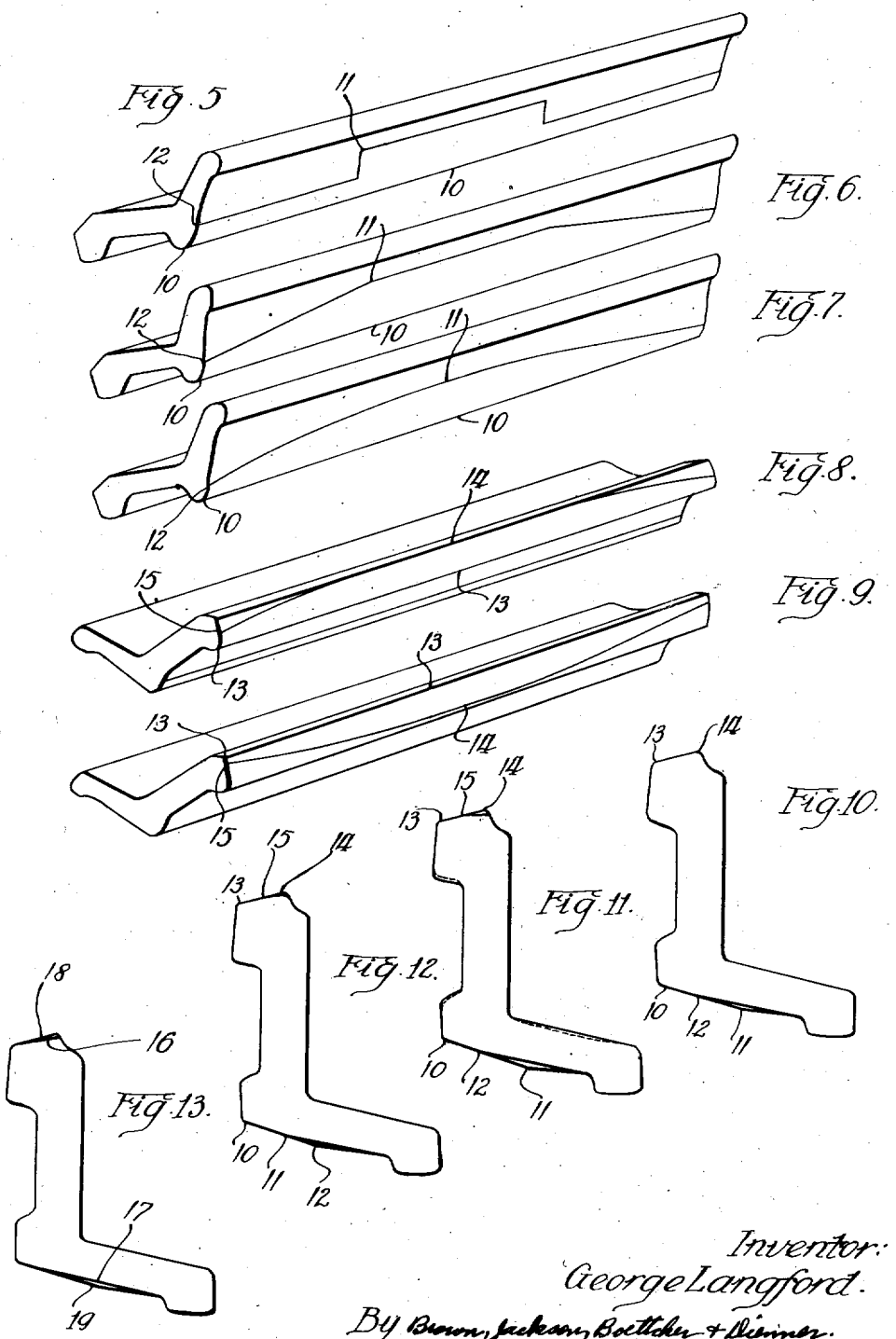
Inventor:
George Langford.
By Brown, Jackson, Boettcher + Dienner.
Attys.

G. LANGFORD

Aug. 16, 1932. TIGHT CENTER BAR Re. 18,568

3 Sheets-Sheet 3

Original Filed March 25, 1929

Inventor
George Langford.
By Brown, Jackson, Boettcher & Dienner.
Attys.

Reissued Aug. 16, 1932

Re. 18,568

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

TIGHT CENTER BAR

Original No. 1,799,380, dated April 7, 1931, Serial No. 349,567, filed March 25, 1929. Application for reissue filed February 26, 1932. Serial No. 596,649.

This invention relates to a rail-joint and may be specifically defined as a new teaching in rail joint performance made practical by an angle bar of novel construction. One of the main objects of my invention is to provide a rail joint capable of giving better service than rail joints now in use, by employing angle bars balanced for wear and strain throughout their lengths. My invention relates not to a single type of bar but to a construction which may be applied to all types of bars now in extensive use, and therefore relates to any and all types of rail joints wherein my novel principle of construction and operation is embodied.

The common form of rail joint is one in which two rail ends are joined together by two angle bars or "fish plates", rails and bars being held in place by bolts passing through holes in the bars and rails.

The holes, for short bars 24 to 28 inches long and six for bars 36 to 40 inches long, are larger than the bolts and permit slight longitudinal movement of the rail ends upon the bars, necessitated by expansion and contraction of the rails throughout the range of high and low temperatures. To perform properly a joint must be free enough longitudinally to permit slight movement of the rails upon the bars, and yet sufficiently rigid to keep the two rail ends in alignment laterally and vertically to avoid pounding under passing train wheels. If one rail end is out of alignment with the other, both rail ends become battered down to such an extent that the point becomes unfit for further service and must be repaired.

It is known in the prior art that the effectiveness of a rail joint is dependent upon a restricted central portion covering from 3 to 4 inches of each rail end, so that in an angle bar, the middle 8 inches or so, comprising a third or less of its length, must in the main be depended upon to keep the joint tight, the end portions contributing laterally to hold the center in both lateral and vertical alignment. When new bars are placed upon new rail ends, the bars may be straight and parallel to each other after being bolted up. After wear begins, the bars bend in at center, for there is where the most wear occurs. This bending in at center is accomplished by the center bolts as the joint becomes loose there because of wear, the end portions of each bar holding back because of lesser wear.

The two bars once straight and parallel to each other become bent inward to the rails at center.

These conditions have long been known to the prior art and it is also known that angle bars wear more at the center than at the ends, so much so that although a bar may be worn out at center, its end portions would have more years of life were it not for the badly worn center. With such a condition, a rail joint cannot be fully efficient, for it is unbalanced as to wear in service. An important object of my invention is to create a more efficient joint by insuring a more even balance of wear between the central and end portions of the bar.

Another important object is to insure a better balance of strains in the joint. The bending in of the bars laterally at center to take up wear is well known in the prior art and has been accepted as common practice. In years past angle bars were lighter than in later years, being less rigid laterally and made of low or medium carbon steels unhardened. They therefore yielded readily to bending and stayed bent because of their lack of resiliency. The bolts were made of similar steel and served their purpose, being of sufficient tensile strength to pull and hold the bars inward to the rail ends at center. However, in later years there has been a change in these conditions resulting in much trouble with rail ends, bars and bolts.

The old angle types of bars have yielded to I-beam types with heavy lateral reinforcement of the head portion, resulting in greatly increased lateral as well as vertical strength. Low to medium carbon steels have given way to medium to high carbon steels and the bars are now hardened by oil-quenching, so that where 75,000 lbs. per square inch tensile strength was formerly considered sufficient, bars of 125,000 lbs. per square inch tensile strength and over are now used. Obviously such bars are far more resistant to bending in laterally at center, and because of their resiliency, this resistance is constantly maintained against the pull of the center bolts. To the constant lateral strain is added the vertical pounding load under train wheels, all of which contributes to "fatigue failure" or final rupture of the steel. An important object of my invention is to relieve the bars of unnecessary strain, particularly of the lateral bending strains due to the resistance to bending inward at center against the pull of the center bolts.

Still another object is to secure a better balance of tension between the center and end bolts. The great resistance of the bars to lateral flexure inward at center is, in the prior art, balanced by the tension upon the center bolts. The advent of harder and stiffer bars necessitated a change in the bolts, where users found that with the new bars, joints could not be kept tight at center and bolts were literally pulled in two.

And so bolts had to be made larger, of higher carbon steel and oil-quenched, the same as bars and there is ever a contest between both; bolt-tension versus bar resistance to lateral flexure "Why do bolts break?" is a subject under serious discussion by railway engineers. The answers given indicate that the center bolts are under too great tension or the bars "freeze" to the rails, that is, they cannot move upon each other longitudinally, the extreme bolt tension at center pinching the rails ends between the bars and preventing longitudinal motion of one upon the other. Where less than 10,000 pounds tension is sufficient to hold the ends of the bars tight to the rails, more than 25,000 is sometimes needed to keep the center tight and more than half of this is wasted effort, absorbed by the bars' lateral resistance, and contributes nothing to the tightness of the joint. My invention insures a comparatively even balance between center and end bolt tension.

Another object is to maintain a better fit of the bars at center as compared with the ends under service conditions. The lateral resistance of hard rigid bars to center bolt tension soon results in a fit looser at center than ends and continues unless the center bolts are tightened up. Because of the lesser wear at ends, the ends of the bars are reluctant to move inward as the center moves inward and this I find to be the real source of trouble preventing proper balance between center and ends of rail joints.

My recognition of this condition, the establishing of it as the real cause of trouble, and its cure, have resulted in the novel principle of angle bar construction of my invention, the advantages of which will be apparent from the following description as set forth in connection with the accompanying drawings, in which:

Figures 5 to 9 are perspective views of angle bars showing various structures to carry out the principle of my invention;

Figures 10 to 13 are end views of bars of different forms embodying my invention;

It is to be understood that my invention may employ numerous variations of structure to accomplish its purpose and I do not limit myself to the particular structure herein illustrated excepting insofar as such limitations may be imposed by the appended claims.

Figure 2:
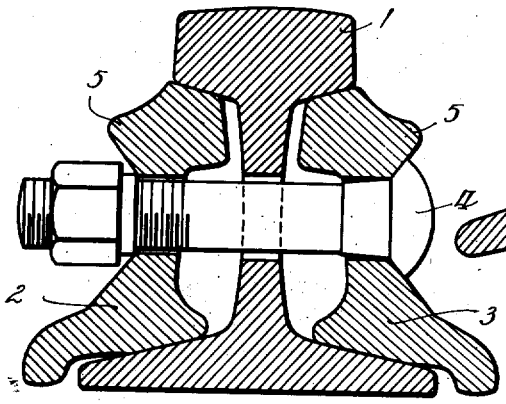
Figure 2 is a mid-sectional view of a modern type of rail joint illustrating the present prior art.
Figure 1:
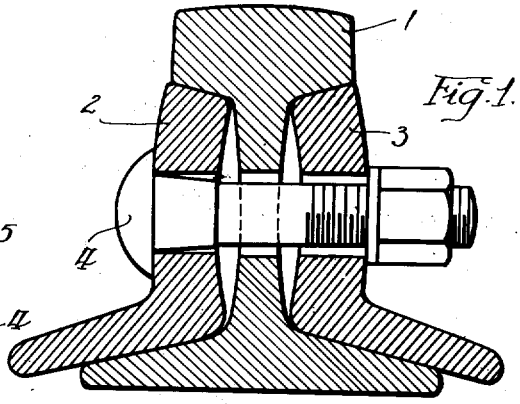
Figure 1 is a mid-sectional view of an old type of rail joint illustrating the early prior art.

For purposes of comparison, and to facilitate the description of my invention, I show in Figures 1 and 2 early and modern types of rail joints. The rail 1 is fitted with two bars 2 and 3 connected by bolts 4. In Figure 1 the bars 2 and 3 are of the angle type without lateral reinforcement of the head. Figure 2 shows I-beam bars laterally reinforced. It can be seen from a comparison of Figures 1 and 2 that the modern angle bar (Figure 2) is much more rigid laterally than the old type, (Figure 1), the greater bolt tension required in Figure 2 being reflected in the larger bolt 4.

Figure 3:
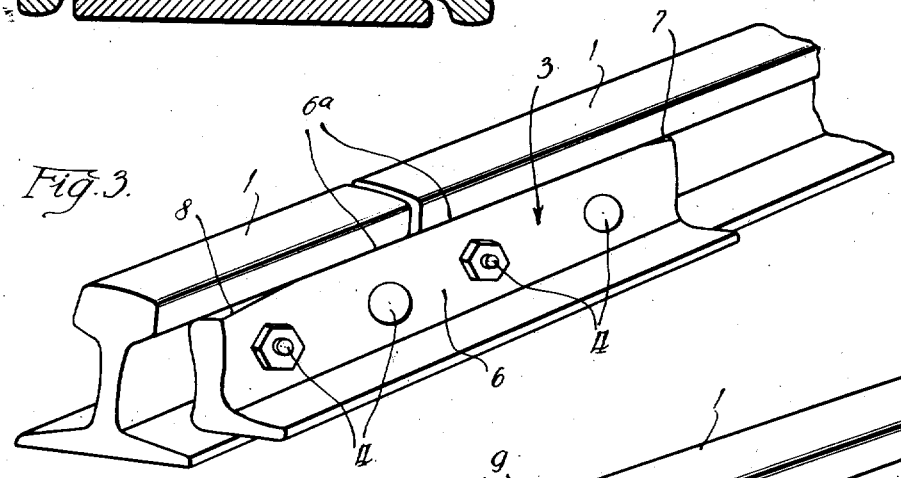
Figure 3 is a perspective view of a rail joint illustrating one condition of a rail joint in service.

Figure 3, which is a perspective view of the joint of Figure 1, shows a bar 3 bolted to a rail 1, the center portion 6 being bent inward by the bolts 4 to take up wear at 6*a* and the end portions 7 and 8 remaining out because of the lesser wear there than at the center.

Figure 4:
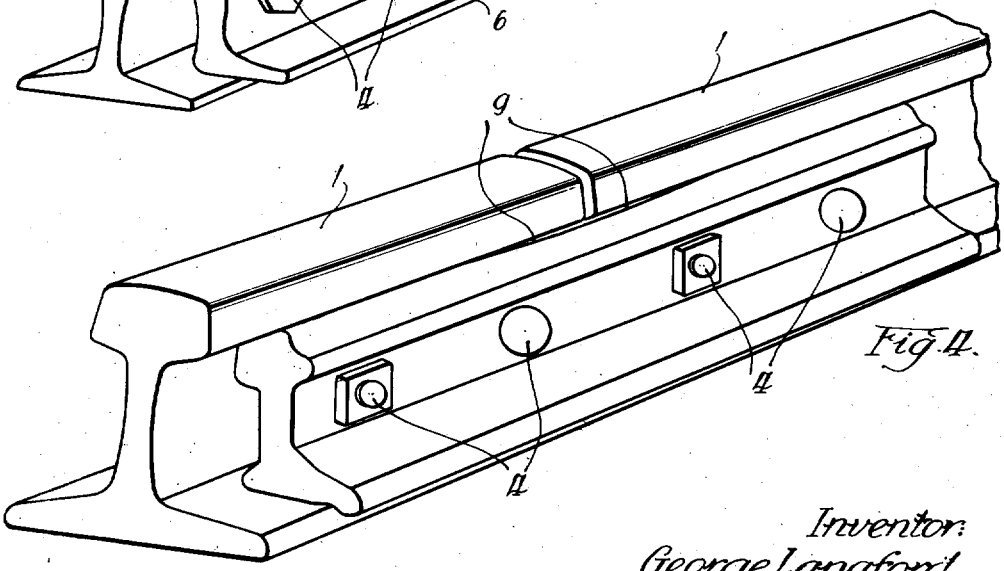
Figure 4 is similar to Figure 3 but illustrating another service condition.

Figure 4 is a perspective view of the joint of Figure 2 illustrating how, in service, the resiliency of the hard and rigid modern bar resists center bolt tension to bend it in laterally, resulting in a loose fit at center, at 9, necessitating excessive strains upon center bolts and bars to force a tight fit at center.

From a comparison of Figures 3 and 4, it may be seen that while the soft laterally yielding angle bar of Fig. 3 accommodates itself readily to the restricted central wear of the joint, the laterally rigid bar of Fig. 4 does not so accommodate itself. It is too rigid to be bent in to fit the central wear, the resistance to inward bending beginning each side of the restricted central portion of the joint and continuing outward to each end. If in the case of the rigid bar of Fig. 4, the span for inward bending action could be increased, the resistance of the bar to inward bending would be lessened, thereby approaching the condition of Fig. 3 and securing a tighter joint. If the span for inward bending could be increased to the ends of the bar, a still tighter joint at center could be maintained; and finally, if the extreme end resistance were entirely removed, there would be no inward bending of the bar at center to take up wear. The bar as a whole would move inward. The present invention goes a step farther. To make sure of absolutely no end resistance and inward bending action at center, the ends of the bar are so designed as to hasten movement inward at the ends, so that if there is any bending action resulting from uneven movement inward as between center and ends, the ends of the bar and not the center will be the first to move inward, so that as wear occurs, the tendency to longitudinal curvature will be outwardly and not inwardly.

Having defined the prior art insofar as it applies to my invention, I will now describe my invention, illustrating various forms of structure. As may be understood from Figures 3 and 4, the lack of balance in the ordinary rail joint between center and ends as to wear, fit and lateral strains of the bars and tension of the bolts, is due primarily to the fact that the end portions of the bars do not keep pace with the center portion as to wear, and their reluctance to move inward with the center sets up the various unbalanced conditions referred to. These conditions I have recognized as traceable to one source and the remedy is simple. In service, the ends of each bar must move in to the rails at least as fast as the center portion to avoid objectionable lateral flexure of the latter, and as it is difficult to design certain kinds of bars so as to insure exactness, any tolerance in the ratio of inward travel as between center and ends, should permit the ends to move in slightly faster than the center but no slower. Lateral flexure of the center portion of the bar is to be avoided, but slight flexure caused by pulling the ends in is not objectionable, particularly as it helps to keep the joint tight at center, and slight looseness at the ends caused by resistance of that portion of the bar to lateral flexure is not serious. In my copending application for even wear bar, filed March 28, 1929, Serial Number 350,734, I have disclosed a bar in which the center and end portions of the bearing surfaces are balanced for equal rate of wear. An exact balance of inward movement is the ideal condition particularly when applied to unworn rail ends; and a complete reversal of the prior art, although not ideal, would still be a great improvement over the prior art.

A practical application of my invention is a construction that, starting with the bars straight and parallel to each other, permits them to take up wear slightly faster at the ends than at the center. To accomplish this, I have modified the bar fishing surfaces so that the area of bearing upon the rails is greater at the center than at the ends. The bearings which are full and normal at center are reduced at the ends. Figures 5 to 7 show various modifications of flange fishing. In these figures, 10—11 represents the normal length of flange fishing at center, and 10—12 the subnormal length at ends. Figures 8 and 9 show this principle applied to the head fishing, the center bearing 13—14 being of normal length and the end bearings 13—15 subnormal.

Figures 10, 11 and 12 are end views of bars embodying the principle of Figures 5 to 9, the center and end bearings being similarly numbered. In Figure 10 only the flange fishing is reduced at the ends.

In Figures 11 and 12, the head and flange fishings are both reduced at the ends. In Figure 13 the desired effect is obtained by a reduction of the angle of the end portions 16 and 17 of the head and flange bearing surfaces, respectively, relative to the center portions 18 and 19, respectively, of such surfaces. To obtain the desired decrease in fishing contact from the center portion to the ends, the angle of the end portions of the fishing surface to the horizontal decreases from the center portion of the bar to the ends thereof, as will be understood from the above. This will result in the area of fishing contact of the end portions of the fishing surface decreasing from the center portion toward the ends of the bar in substantially the same manner, in effect, as the fishing surfaces of the bars in Figures 11 and 12.

Figure 14:
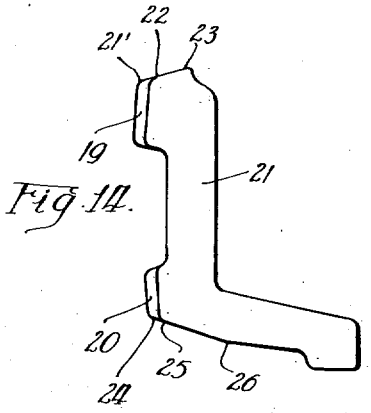
Figures 14 and 15 are end views of bars of additional and more complicated forms, embodying my invention.
Figure 15:
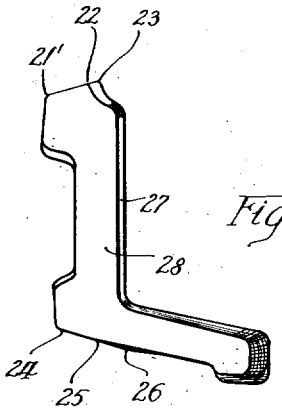

Figures 14 and 15 illustrate additional forms of bars embodying my invention. In Figure 14 the center portion of the bar is extended inwardly at the head and flange, at 19 and 20, respectively, so that these portions are appreciably thicker than the end portions 21 and the head and flange bearing surfaces at the center portion of the bar are correspondingly wider than the end portions of such surfaces. In this figure, the center portion of the head bearing surface is of the width 21′—23, the width of the end portion being 22—23, and the width of the center of the flange bearing is 24—26, the width of the end portion being 25—26. In Figure 15 the center portion of the bar is thickened outwardly at 27, the entire cross-area of this portion of the bar being increased relative to the ends 28. In this figure the widths of the different portions of the bearing surfaces are indicated by the same numbers as in Figure 14. The bars of Figures 14 and 15, while particularly adapted for end wear, embody a principle of construction also well adapted to other types of bars, such as even wear bars in which the end portions of the bearing surfaces wear at approximately the same rate as the center portions of such surfaces. In any type of bar, in practice, certain tolerances are permissible, as will be understood by those skilled in the art. It will be understood, therefore, that the principle of construction illustrated in Figures 14 and 15, comprehends, in its broader aspect, bars of various types in which the section of the ends of the bar is reduced relative to the section of the center portion of the bar for reducing the contact area of the fishing or bearing surfaces of the ends of the bar.

Figure 16:
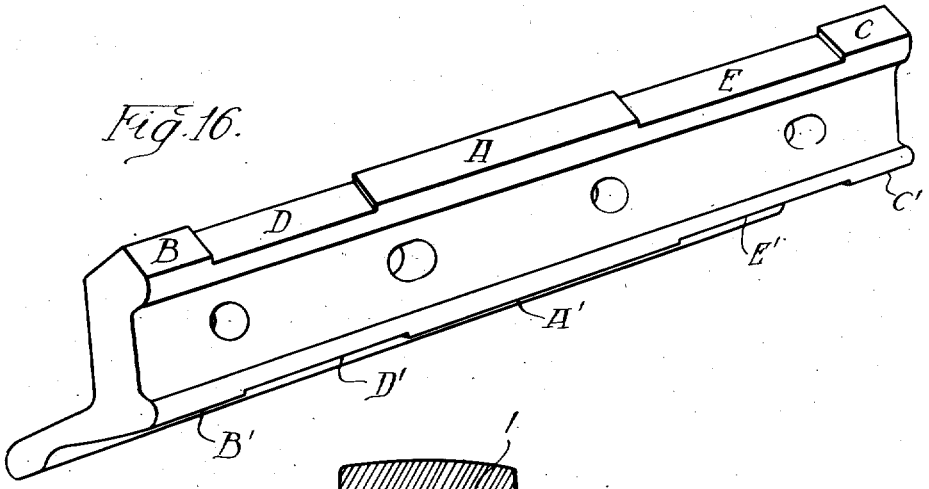
Figure 16 is a perspective view of a bar of still another form, embodying my invention.

In Figure 16, illustrating another construction, the angle bar has bearing surfaces A and A′ at the center and reduced bearings at the ends B′, B and C, C′ with gaps D, D′ and E, E′ between the center and the ends. The areas B, B′ and C, C′ are such that the ends wear faster than the center. In all of the bars illustrated, the reduction of bearing area at the ends may be applied to the head or the flange fishing, only, or to both, the amount of reduction being determined by computation and experiment.

In all cases the bars have fishing contact and take-up at the center and the ends, the rate of wear, and consequently the take-up being somewhat greater at the ends than at the center.

There are now in use, crowned bars of greater fishing height at the center than at the ends. Inasmuch as these bars are designed for fishing contact throughout their length, they may be used on worn rail ends whose worn fishing surface contours correspond to the crown so that the bars will fit to the rails without lateral flexure, or they may be used on worn rails by bending the ends in to secure contact with the rails throughout their length. Knowing that bars become loose at the center and must be bent in there to maintain a tight joint, an initial advantage is gained by crowning the center so that the ends will draw inward when the joint is first bolted up. In the case of unworn rail ends, I find in practice that a crown of 1/64 inch is customary and when more is used, the bar sometimes breaks through one of the spike slots because of the lateral bending strain. The slight lateral bending in of the ends serves to keep the center tight at first and the bar does not bend in at center until after the 1/64 inch or more of crown is worn off. However, the crowning feature used to make a tight center then disappears and the once crowned bar becomes an ordinary bar unbalanced for wear, lateral strain, fit and bolt tension. Inasmuch as the "draw space" between bar and rail at the center is now about 7/32 inch, allowing for a 7/64 inch reduction by wear in height of fishing before the joint is worn out, it may be seen that the initial crowning of 1/64 inch provides for only 1/7 the life of the joint or about one year, the other 6/7 or six years employing a bar uncrowned and therefore of ordinary type.

Crowning for wear of the rail ends should not be confused with crowning to insure slight end tension. A bar may be crowned 1/16 inch to conform to the wear of the rails and 1/64 inch of crowning is then added to isure end tension and as has been shown, the added crowning for tension secures only an initial advantage. As wear occurs, each bar moves in at center and the ends lag, the outside originally convex becoming straight and finally concave, the latter condition being the one to be avoided.

My invention is an advance over the crowned bar provided with tension crown; that is, the 1/64 inch or so of extra height to insure lateral flexure and a tight center initially. It omits the tension crown, bars for unworn rails having no crown whatever and being parallel to each other when first bolted up to the rails. With the end fishing areas of proper value relative to the area of the center portion of the fishing, as above, the ends move in faster than the center and the bar initially straight becomes bowed in at the ends, but never bowed in at the center as is the case with ordinary straight or crowned bars. My bar therefore performs differently from the crowned bar the former starting without end flexure and gradually acquiring it; the latter starting with end flexure and soon losing it, so that in the case of my bar, the joint tightens up at the center as wear progresses. This desirable feature of my invention is entirely absent in ordinary straight or crowned bars.

In the case of badly worn rails, the tension crowning added to crowning for wear only in ordinary crowned bars above referred to, is absorbed, in some cases, where there is more rail end wear than in others. In such cases I use an end wear bar crowned in conformity with the rails least worn, so that when bolted up, the bars are straight or sometimes bent in at center, an initial disadvantage soon corrected by moving in of the ends, this latter provision in the end wear bar obviating the necessity for tension crowning to secure end tension and a tight center, a feature necessary in the crowned bar, which bar can never acquire more end tension and tightness at the center than it had initially.

I have made numerous bars in accordance with my invention as above set forth, and these bars have been in service for a sufficient length of time to prove that they function in an entirely satisfactory manner, as above described, and obviate the objections above noted to rail joint bars, both crowned and uncrowned, of ordinary type such as are now in common use.

My tight center bars can be produced by machining, grinding, die-forming or bull-dozing operations, as preferred. The bars are first rolled in long strips and sheared to length as is usual and the end fishings, flange or head, or both may be ground or machined cold or they may be die-formed or bull-dozed hot or cold, but little work being required to effect a reduction of the fishing at the end portions of a bar to the required areas.

My bar lends itself to reforming in dies from ordinary worn angle bars and may be made positively by machining the fishing surfaces in the dies to the structure required; or impositively by methods shown in my co-pending application for method of and die for making bars, filed April 10, 1929, Serial No. 354,142, in which reductions of end fishing area are accomplished by bevelling the dies so that pressure at the ends is relieved, resulting in the structures shown in Figures 5 to 9.

Figure 17:
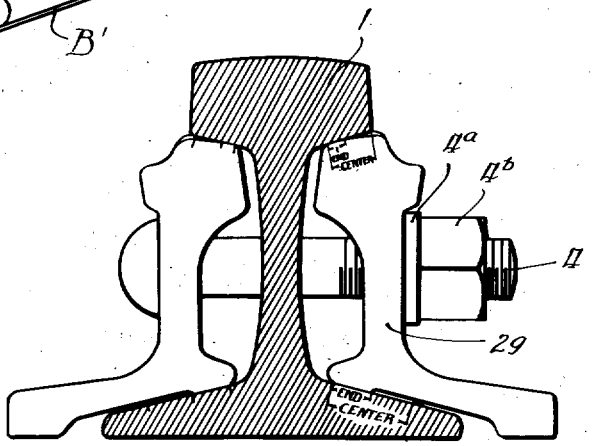
Figure 17 is an end view of a modern type of rail joint illustrating one form of my invention.

In Figure 17 I have illustrated a joint constructed in accordance with my invention. This joint comprises rail ends 1 and angle bars 29 of I-beam type secured in position by bolts 4 which receive lock washer $4^a$ and nuts $4^b$. The bars 29 have the end portions of both the head and the flange fishing surfaces of much less width than the center portions of these surfaces, as shown. The area of the end portions of the fishing surfaces is such that these portions wear slightly faster than the center portions. This is advantageous for two reasons. The rail fishing surfaces have more wear at the center of the joint than at the ends thereof, and by properly proportioning the area of the respective end portions of the bar fishing surfaces, this greater wear of the rail surfaces at the center of the joints, as well as the greater wear of the bar surfaces at the center portion of the joint, can be compensated for. By further reducing the relative area of the end portions of the bar bearing surfaces, the rate of wear of these end portions becomes slightly greater than the rate of wear of the rail and bar fishing surfaces at the center portion of the joint, so that the ends of the bars are bent inwardly slightly, after the joint has been in service some time, providing an automatic take up of wear at the center.

I also contemplate providing for center take-up by bending the ends of the bars inwardly slightly when initially applied, the bearing surfaces of the bars and the rail ends being properly disposed and related to obtain a uniform rate of wear at the center and the ends of the joint. The bars thus retain their initial relation to the rail ends and the desired pressure at the center portion of the joint is maintained.

A rail joint constructed in accordance with my invention, provides wear balance in that it eliminates excessive lateral flexure of the bars, particularly inward flexing of the center portions of the bars, and prevents excessive tension on the bolts and undesirable stresses on the bars. In its broader aspects, my invention contemplates a rail joint so constructed as to obtain the proper balance of wear at the center and end portions of the joint, and relieve the bars of excessive lateral strains and the bolts of excessive tension, as above set forth, whether the desired results be obtained by altering the fishing surfaces of the rail ends, or of the bars, or of both. From a practical stand point, it is more convenient and economical, under present practice, to provide the bars with fishing surfaces properly proportioned and disposed to accomplish the desired results. However, my invention is to be construed as comprehending any construction of rail joint in which the contact surfaces are related in the manner herein disclosed as illustrative of my invention.

While I have illustrated my invention, by way of example, as applied to angle bars of unsymmetrical section, I do not limit it to this one particular type of bar, since it is applicable to bars of various sections, either symmetrical or unsymmetrical.

In a bar which is rigid laterally and resists lateral flexing by bolt tension, the tension of the center bolts of the joint is effective at the ends of the bar to a much greater extent than in a laterally flexible bar. This tension of the center bolts, when a laterally rigid bar is used, supplements that of the end bolts with the result that the ends of the fishing surfaces of such a bar, in the joint, tend to wear more rapidly than in the case of a laterally flexible bar. This difference between the laterally rigid and the laterally flexible bar, as to tendency to wear at the ends of the fishings when in a joint, is taken into consideration and the reduction of end fishing area relative to center fishing area may be somewhat less in a laterally rigid bar than in a laterally flexible bar. In either case, the end portions of the fishing surfaces are so related to the center portions of such surfaces as to cause the ends of the fishings to wear somewhat faster than the center thereof. This results in faster take up at the ends than at the center, which is the result desired, the more rapid end wear providing the means for accomplishing this result.

In the bar of Figure 16, which is shown as a laterally rigid bar, the fishing surfaces A and A′ are of sufficient length to take care of the center wear of the bar, and surfaces B and B′, and C and C′, are of proper area to wear more rapidly than the surfaces A and A′. If the bar of Figure 16 were laterally flexible, the end fishing surfaces should be of less area than shown, to assure wear thereof more rapidly than the center fishing surfaces.

While the present invention is in particular drawn to a rail joint with its fishing surfaces so reduced at its end portions as to cause by wear greater rate of movement of the bar to the rail ends at the ends of the joint, it discloses a bar wherein the end portions of a fishing surface are reduced in width without including its bar member in a similar reduction of width, as is clearly shown in Figs. 5 to 13, inclusive. This is a novel form of fishing surface construction particularly adapted to originally rolled bars whose top or bottom members or both may have their fishing surfaces narrowed at the end portions by partial depression of the end portions out of the plane of rail fishing contact. Such a construction will relieve the bar of end resistance to wear and inward movement, and because of its novelty I do not wish to limit it to a bar providing for greater wear and inward movement at its end portions than at its center portion. More broadly, I claim a fishing surface construction applicable to at least one of the top and bottom members of a bar, wherein a fishing surface is narrowed or reduced in contact area at its end portions independently of its included bar member, and the reduction in contact area need not extend throughout the length of each end portion but for only a limited length at or near each end. This I would define as an extreme end portion sufficiently long however to cause material reduction of end resistance to joint wear and take up of the ends of the bar.

As regards crowned bars made of greater fishing height at the center portion than at the end portions, the crown may be disposed to conform to the central fishing wear of worn rail ends in conjunction with increased effective fishing width at the center portion or with decreased effective fishing width at the end portions or with decreased fishing width for sufficient length at each extreme end to effect a material reduction of end resistance of the bar to wear and inward movement, these changes being applied to the fishing surface independently of the included bar member.

What I claim is:

1. In combination in a rail joint, two bars bolted to the rails at opposite sides thereof and movable by bolt tension inwardly toward the rails to take up wear, said bars having fishing contact with the rail at both their end portions and their center portions, there being draw space at the center and end portions of the bars, the areas of contact between the rail fishing surfaces and the bar fishing surfaces at different portions of the joint being so related and disposed as to cause the end portions of said surfaces to wear at a greater rate than the center portions thereof.

2. In combination in a rail joint, two bars bolted to the rails at opposite sides thereof and movable by bolt tension inwardly toward the rails to take up wear, said bars having fishing contact with the rail at both their end portions and their center portions, there being draw space at the center and end portions of the bars, the area of fishing contact per unit of length at the end portions of the bars being less than at the center portions thereof, the end portions of the bars being movable inwardly by bolt tension to take up wear at a greater rate than the center portions of the bars.

3. In combination in a rail joint, two bars bolted to the rails at opposite sides thereof and movable by bolt tension inwardly toward the rails to take up wear, said bars having fishing contact with the rail at both their end portions and their center portions, there being draw space at the center and end portions of the bars and the center portions of said bars being spaced differently than the end portions thereof relative to the rail when the bars are initially applied, the area of fishing contact per unit of length at the end portions of the bars being less than at the center portions thereof, the end portions of the bars being movable by bolt tension to take up wear at a greater rate than the center portions of the bars.

4. In combination in a rail joint, two bars bolted to the rails at opposite sides thereof and movable by bolt tension inwardly toward the rails to take up wear, said bars having fishing contact with the rail at both their end portions and their center portions, and means causing wear of the bearing surfaces at the end portions of the joint at a greater rate than at the center portion of the joint.

5. A rail joint comprising two bars bolted to the rails at opposite sides thereof and movable by bolt tension inwardly toward the rails to take up wear and having fishing contact with the rail at both their end portions and their center portions, the contacting fishing surfaces of the bars and the rails being so disposed and related that the rate of wear at the end portions of the joint is greater than at the center portion of the joint.

6. In combination in a rail joint, two bars bolted to the rails at opposite sides thereof and movable by bolt tension inwardly toward the rails to take up wear, said bars having fishing contact with the rails at both their end portions and their center portions, there being draw space at the center and end portions of the bars, the area of contact per unit of length between the rail and the bar fishing surfaces at the end portions of the bars being sufficiently less than the area of contact per unit of length of such surfaces at the center portions of the bars to cause the fishing surfaces at the end portions of the bars to wear at a faster rate than such surfaces at the center portions of the bars.

7. In combination in a rail joint, two bars bolted to the rails at opposite sides thereof and movable by bolt tension inwardly toward the rails to take up wear, said bars having fishing contact with the rail at both their end portions and their center portions, there being draw space at the center and end portions of the bars, the contact area per unit of length of the fishing surfaces of the bars at the end portions thereof being sufficiently less than the contact area per unit of length at the center portions of the bars to cause wear of the end portions of such surfaces at a greater rate than the center portions thereof.

8. In combination in a rail joint, two bars bolted to the rails at opposite sides thereof and movable by bolt tension inwardly toward the rails to take up wear, said bars having fishing contact with the rail at both their end portions and their center portions, there being draw space at the center and end portions of the bars, the contact area per unit of length of certain of the fishing surfaces of the bars being sufficiently less at the end portions thereof than at the center portions of the bars to cause wear of the end portions of such surfaces at a greater rate than the center portions thereof.

9. A rail joint angle bar adapted for bolting to rail ends and having head and flange fishing surfaces, the area per unit of length of the respective end portions of said surfaces being sufficiently less than the area per unit of length of the center portions thereof to cause said end portions to wear at a greater rate than said center portions when the bar is applied in a rail joint.

10. A rail joint angle bar adapted for bolting to rail ends and having head and flange fishing surfaces, the area per unit of length of the respective end portions of one of said surfaces being sufficiently less than the area per unit of length of the center portion thereof to cause said end portions to wear at a greater rate than said center portion when the bar is applied in a joint.

11. A rail joint angle bar adapted for bolting the rail ends and having head and flange fishing surfaces, the area per unit of length of the respective end portions of the flange fishing surface being sufficiently less than the area per unit of length of the central portion thereof to cause said end portions to wear at a greater rate than said center portion when the bar is applied in a joint.

12. In a rail joint angle bar adapted for bolting to rail ends and having head and flange fishing surfaces comprising portions thereof disposed and related to provide, when the bar is applied in a joint, an area of contact between the rail and the bar fishing surfaces at the respective end portions thereof sufficiently less per unit of length than the area of contact between such surfaces at the center portion of the bar to cause wear of the end portions of the fishing surfaces at a greater rate than the center portions thereof.

13. A rail joint angle bar adapted for bolting to rail ends and having head and flange fishing surfaces comprising portions disposed and related to provide sufficiently less fishing contact area at the end portions of the bar than at the center portion thereof to cause said end portions to wear at a greater rate than said center portion.

14. In combination in a rail joint, two bars bolted to the rail ends at opposite sides thereof, the bars when applied new to unworn rails being parallel to each other and to the rails, the fishing surfaces of the bars being of less contact area per unit of length at the end portions than at the center portions thereof, the end portions of the fishing surfaces of the bars wearing at a faster rate than the center portions thereof in service, the end portions of the bars being drawn in by bolt tension to take up wear and the bars assuming a convex curvature outward during continued wear of the joint.

15. A rail joint bar having a head portion and a foot portion, each of said portions being provided with a fishing surface adapted for both center and end contact with the corresponding surfaces of the rail ends when the bar is applied in a rail joint, one of the fishing surfaces of the bar having a substantially rectangular central portion and substantially rectangular end portions of less width than said central portion and so related thereto as to cause said end portions to wear at a greater rate than the center portion.

16. In combination in a rail joint, two bars bolted to the rails at opposite sides thereof and movable by bolt tension inwardly toward the rails to take up wear, said bars having fishing contact with the rails at both their end portions and their center portions with substantially equal center and end bolt tension when first applied, there being draw space at the center and end portions of the bars, the areas of contact between the rail fishing surfaces and the bar fishing surfaces at different portions of the joint being so related and disposed as to cause the end portions of said surfaces to wear at a greater rate than the center portions thereof.

17. In combination in a rail joint, two bars bolted to the rails at opposite sides thereof and movable by bolt tension inwardly toward the rails to take up wear, said bars having fishing contact with the rails at both their end portions and their center portions with substantially equal center and end bolt tension when first applied, there being draw space at the center and end portions of the bars, one at least of the fishing surfaces of each bar being narrower at the end portions of the bars than at the central portions to effect a reduction of total end fishing area per unit of length as compared with the total central fishing area per unit of length, in amount to cause the end portions of the bars to wear and take up faster than the central portions of the bars.

18. A rail joint bar adapted for bolting to rail ends and having head and foot fishing surfaces, the head and the foot having depressions in the fishing surface area between the center portions and the end portions thereof, the contact area of the respective end portions of each fishing surface being sufficiently less than the contact area of the center portion thereof to cause said end portions to wear at a greater rate than said center portion.

19. A rail joint bar adapted for bolting to rail ends and having head and foot fishing surfaces, said bar having depressions in the area of one of the fishing surfaces between the center portion and the end portions thereof, the contact area of the respective end portions of said surface being sufficiently less than the contact area of the center portion thereof to cause said end portions to wear at a greater rate than said center portion.

20. A rail joint bar adapted for bolting to rail ends and for top and bottom fishing contact with the rail ends at the center portion and end portions of the bar, one of the fishing surfaces of the bar having its end portions, including the extreme ends thereof, so reduced in contact area per unit of length relative to the center portions of such surface as to wear and move to the rails sufficiently rapidly to prevent inward bending strain of the center of the bar and cause the ends of the bar to be placed under inward bending strain by wear and bolt tension, when the bar is in service in a joint.

21. A rail joint bar adapted for bolting to rail ends and for top and bottom fishing contact with the rail ends at the center portion and the end portions of the bar, the end portions of the fishing surfaces, including the extreme ends thereof, providing for reduced rail fishing contact relative to the center portions of said surfaces and in sufficient amount to accelerate wear and inward movement of the end portions of the bar and relieve the center of the bar of inward bending strain while placing the ends of the bar under inward bending strain, by wear and bolt tension, when the bar is in service in a joint.

22. A rail joint comprising a head portion and a foot portion, each of said portions being provided with a fishing surface adapted for both center and end contact with the corresponding surfaces of the rail ends when the bar is applied in a rail joint, one of the fishing surfaces of the bar being defined by straight lines and the end portions thereof being of sufficiently less contact area per unit of length than the center portion of such surface to assure wear of said end portions in the joint at a greater rate than the center portion of said surface.

23. A rail joint bar reformed from an originally rolled bar, said reformed bar having at least one of its top and bottom members of uniform width throughout its length, and said member having its included fishing surface made of less effective rail contacting width at its end portions than at its center portion by partial depression of each end portion of the original fishing surface out of the plane of rail fishing contact.

24. In a rail joint bar, a fishing surface construction comprising a bar member and an included fishing surface, the difference of width between said member and said fishing surface being greater at the ends than at the center portion.

25. In a rail joint bar, a fishing surface construction comprising a bar member of uniform width throughout its length and an included fishing surface, said surface having greater area per unit of length at its center portion than at its end portions and being wider at its center portion than at its ends.

26. A rail joint bar for use on worn rails, said bar being reformed from a bar originally having one at least of its top and bottom members of uniform width throughout its length, said member in the reformed bar having its included fishing surface crowned and said fishing surface providing for greater effective width of rail contact at its center portion than at its end portions.

In witness whereof, I hereunto subscribe my name this 23 day of February, 1932.

GEORGE LANGFORD.